United States Patent Office 2,923,495
Patented Feb. 2, 1960

2,923,495
VERTICAL TAKE OFF AIRCRAFT WITH JETTISONABLE AUXILIARY ENGINE

Helmut P. G. A. R. von Zborowski, Brunoy, France

Application March 15, 1957, Serial No. 646,500

Claims priority, application France March 17, 1956

2 Claims. (Cl. 244—12)

The present invention relates to aircraft capable of taking off vertically and preferably of landing vertically, such aircraft being designated by the expression "V.T.O." (vertical take off). My invention is more especially but not exclusively concerned with V.T.O. aircraft having a tunnel-shaped wing, as described in my French Patent No. 1,050,948.

The chief object of my invention is to provide an aircraft of this kind which is better adapted to meet the requirements of practice than those known at the present time.

My invention is concerned with V.T.O. aircraft carrying, fixed thereto through separable fixation means, at least one container in which is housed a load to be transported by the aircraft. According to my invention, this container carries a propelling unit capable of applying thereto a frontward thrust, said propelling unit including a power plant incorporated in said container and, housed in said container, a limited amount of fuel for said power plant.

Preferred embodiments of my invention will be hereinafter described with reference to the accompanying drawings given merely by way of example and in which.

Figure 1:
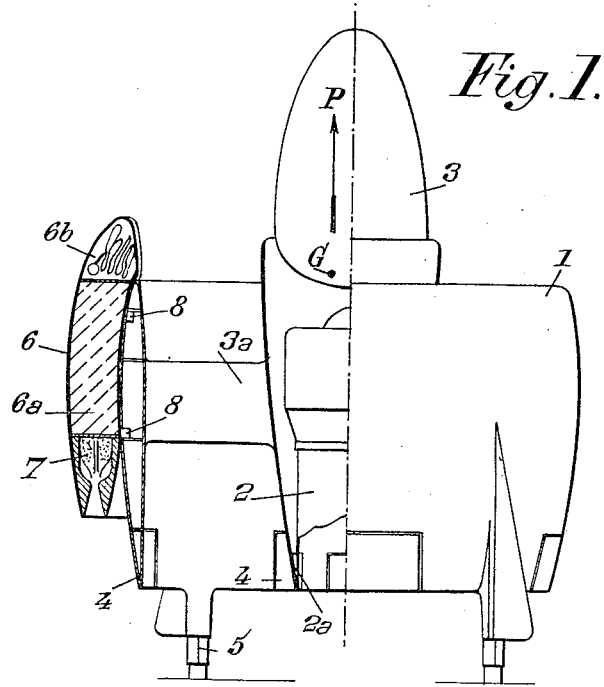
Fig. 1 is an elevational view with parts cut away of a tunnel-shaped V.T.O. aircraft made according to my invention.
Figure 2:
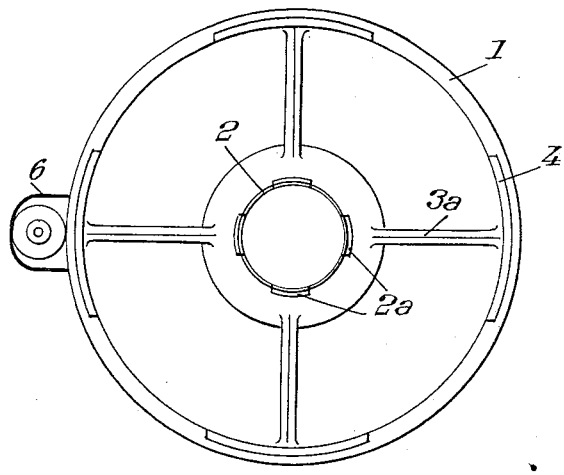
Fig. 2 is a bottom view of this aircraft.

The aircraft proper may be made of any construction and in particular as described in my French Patent No. 1,050,948.

Such an aircraft includes a lift producing wing 1 of tunnel shape, preferably in the form of a body of revolution about its longitudinal axis X—Y, which constitutes the zero lift axis of the aircraft.

This wing carries a propulsion system the thrust vector of which is substantially in coincidence with the above mentioned longitudinal axis X—Y. This propelling system is advantageously constituted, as shown by the drawings, by a turbo-jet engine 2 the nozzle of which is advantageously provided with jet deflecting means 2a. Said turbo-jet engine is for instance housed in a fuselage 3 coaxial with the annular wing 1 and connected to the internal wall thereof through radial arms 3a.

Control surfaces 4 are provided to give said zero lift axis X—Y a positive incidence.

This aircraft may rest upon the ground in the upright position, for instance by means of supports 5.

It is of course advantageous to utilize an aircraft such as above referred to for different purposes, for which the aircraft must transport elements of different weight and/or volume.

For instance, the same V.T.O. military plane might be used as a scouting plane, or a liaison plane or an attack plane, or again as a light bomber or as a fighter.

In order to permit such multiple uses of a given aircraft, it is necessary to provide it with different loads corresponding to said different uses, without its taking off characteristics being impaired.

It should be well understood that the term "special load" may apply to many different things, such for instance as:

One or several supplementary fuel tanks,
A machine gun and ammunition for such gun, located in a streamlined casing or envelope,
One or several rockets housed in a launching device,
Bombs of any kind,
Photographic and moving picture cameras,
Radio units, both for transmitting and receiving,
A television camera system,
A special cockpit for the pilot.

In the following description I will use the term "special load" to designate any of these elements.

According to my invention, the special load is housed in a container 6 provided with its own propulsion unit disposed in such manner that, when container 6 is secured to the aircraft, the thrust developed by said propulsion system 7 is added to the thrust developed by the turbo-jet engine 2.

Advantageously, the propulsion unit of container 6 is constituted by a rocket engine 7 making use of a solid fuel (such for instance as powder), the time for which this fuel can burn advantageously ranging from ten to twenty seconds (as an average fifteen seconds). Such a duration of operation of the propulsion system 7 enables the V.T.O. aircraft to reach the speed at which the aerodynamic forces become sufficient permit of stabilizing and guiding the aircraft.

Advantageously, the propulsion unit 7 of container 6 is arranged in such manner that, when the container is secured to the V.T.O. aircraft, the thrust developed by said propulsion unit 7 is substantially parallel to the longitudinal axis X—Y of the aircraft.

It is of advantage to give the propulsion unit 7 of container 6 characteristics such that it develops a thrust the ratio of which to the weight of the container (with the special load therein) is substantially equal to the ratio of the thrust of the propulsion system of the aircraft to the weight thereof under take off conditions but without container 6 being fixed to the aircraft.

Thus, whatever be the position and the weight of container or containers 6, the total thrust P applied to the aircraft (sum of the thrust of the propulsion means 2 of the aircraft and of the thrust of the propulsion unit 7 of the container 6) passes through the center of gravity G of the aircraft having container or containers 6 fixed thereto.

It should be noted that container 6 may be jettisonable and on the drawing I have diagrammatically shown at 8 detachable fixation means for connecting container 6 to the external wall of wing 1, said fixation means 8 being detachable from the inside of the aircraft cockpit. Such detachable fixation means may be constituted in any suitable manner, for instance as used for securing bombs to aircraft.

When the fixation means 8 are provided on the external wall of wing 1, it is advantageous to locate them substantially in line with one of the radial arms 3a connecting wing 1 and fuselage 3.

In some cases, container 6 might be fixed not to the outer wall of wing 1 but to the inner wall thereof.

The load which is to be transported in container 6 is preferably located in a special compartment 6a provided in said container. When said container is jettisonable, it may further include a special compartment 6b for housing a parachute together with means for extracting said parachute from said compartment.

Container 6 may carry some elements belonging to the structure or the equipment of the aircraft, for instance a landing support or a tail unit.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In combination, a vertical take off aircraft having a propelling unit, at least one container, said container including at least one chamber for carrying a useful load, means mounted on said aircraft fixing said container to said aircraft, said means being capable of transmitting a frontward thrust from said container to said aircraft, and a propelling unit carried by said container for applying thereto a frontward thrust, said propelling unit including a power plant incorporated in said container and, housed in said container, a limited amount of fuel for said power plant, the thrust of said container propelling unit being substantially parallel to the fore-and-aft axis of the aircraft, the characteristics of said container propelling unit being such that the ratio of the thrust of said container propelling unit to the weight of the loaded container is substantially equal to the ratio of the aircraft propelling unit to the weight of said aircraft under take off conditions but without the container secured thereto.

2. A vertical take off aircraft according to claim 1 in which the wing of said aircraft is an annular tunnel-shaped wing to the external wall of which said container is fixed, said aircraft including a fuselage coaxial with said annular wing and radial arms for connecting said fuselage to the inner wall of said wing, said container fixing means being located substantially in line with one of said radial arms.

References Cited in the file of this patent

UNITED STATES PATENTS

| | | |
|---|---|---|
| 2,426,537 | Van Dorn | Aug. 26, 1947 |
| 2,776,622 | Robert | Jan. 8, 1957 |
| 2,787,218 | Anthony | Apr. 2, 1957 |

FOREIGN PATENTS

| | | |
|---|---|---|
| 1,109,645 | France | Sept. 28, 1955 |